United States Patent
Gettings et al.

(10) Patent No.: US 12,319,834 B2
(45) Date of Patent: Jun. 3, 2025

(54) ANTI-CORROSION MATERIAL AND APPLICATION METHOD

(71) Applicant: General Electric Company, Schenectady, NY (US)

(72) Inventors: Rachel Marie Gettings, Niskayuna, NY (US); Dominique T. Everett, Evendale, OH (US); Bernard P. Bewlay, Niskayuna, NY (US)

(73) Assignee: General Electric Company, Evendale, OH (US)

( * ) Notice: Subject to any disclaimer, the term of this patent is extended or adjusted under 35 U.S.C. 154(b) by 604 days.

(21) Appl. No.: 17/555,045

(22) Filed: Dec. 17, 2021

(65) Prior Publication Data

US 2023/0193047 A1    Jun. 22, 2023

(51) Int. Cl.
| | |
|---|---|
| *C09D 5/08* | (2006.01) |
| *B05D 1/02* | (2006.01) |
| *B05D 1/28* | (2006.01) |
| *B05D 1/32* | (2006.01) |
| *B05D 3/12* | (2006.01) |
| *B05D 5/00* | (2006.01) |
| *C09D 1/00* | (2006.01) |
| *F01D 5/00* | (2006.01) |
| *F01D 25/00* | (2006.01) |

(52) U.S. Cl.
CPC ............... *C09D 5/08* (2013.01); *B05D 1/02* (2013.01); *B05D 1/28* (2013.01); *B05D 1/32* (2013.01); *B05D 3/12* (2013.01); *B05D 5/005* (2013.01); *C09D 1/00* (2013.01); *F01D 5/005* (2013.01); *F01D 25/007* (2013.01); *B05D 2202/00* (2013.01); *B05D 2350/38* (2013.01); *F05D 2300/15* (2013.01); *F05D 2300/2118* (2013.01)

(58) Field of Classification Search
CPC ........ B05D 5/005; F01D 5/005; F01D 25/007
See application file for complete search history.

(56) References Cited

U.S. PATENT DOCUMENTS

| | | |
|---|---|---|
| 4,612,049 A | 9/1986 | Berner |
| 4,922,113 A | 5/1990 | Melancon |
| 6,413,578 B1 | 7/2002 | Stowell |

(Continued)

FOREIGN PATENT DOCUMENTS

| | | |
|---|---|---|
| CN | 101443424 | 5/2009 |
| CN | 104493114 A | 4/2015 |

(Continued)

OTHER PUBLICATIONS

Translation of CN 108018517 (Year: 2018).*

(Continued)

*Primary Examiner* — John J DeRusso
(74) *Attorney, Agent, or Firm* — Fitch, Even, Tabin & Flannery LLP

(57) ABSTRACT

Methods for repairing the conventional physical barrier coating barrier on a component having a damaged portion. Applying a coating on the outer surface of the damaged portion of the component. The coating containing a reactive oxide. Initiating a reaction between the coating and the molten sulfates within the outer surface of the component. The reaction catalytically decomposes molten sulfates at the outer surface of the damaged portion of the component.

17 Claims, 4 Drawing Sheets

(56) References Cited

U.S. PATENT DOCUMENTS

| | | |
|---|---|---|
| 7,374,821 B2 | 5/2008 | Laclercq et al. |
| 7,858,952 B2 | 12/2010 | Feist et al. |
| 8,173,206 B2 | 5/2012 | Boutwell et al. |
| 8,334,062 B1 | 12/2012 | Pujari et al. |
| 8,623,526 B2 | 1/2014 | Liu et al. |
| 8,940,417 B2 | 1/2015 | Courcot et al. |
| 9,297,768 B2 | 3/2016 | Yager |
| 9,926,238 B2 | 3/2018 | Louchet et al. |
| 10,022,921 B2 | 7/2018 | Kittleson et al. |
| 10,201,831 B2 | 2/2019 | Sivaramakrishnan et al. |
| 10,829,650 B2 | 11/2020 | Niday et al. |
| 11,078,798 B2 | 8/2021 | Kirby |
| 2002/0164417 A1 | 11/2002 | Khan |
| 2003/0081203 A1 | 5/2003 | Chen |
| 2004/0214938 A1 | 10/2004 | Ruud |
| 2005/0129972 A1 | 6/2005 | Matsumoto |
| 2005/0228098 A1 | 10/2005 | Skoog |
| 2007/0048867 A1 | 3/2007 | Farmer |
| 2008/0026248 A1 | 1/2008 | Balagopal et al. |
| 2009/0078155 A1 | 3/2009 | Maze |
| 2010/0119697 A1 | 5/2010 | Baran, Jr. |
| 2016/0208371 A1 | 7/2016 | Wang et al. |
| 2016/0305034 A1 | 10/2016 | Baque et al. |
| 2017/0152421 A1 | 6/2017 | Ohtake |
| 2017/0183508 A1 | 6/2017 | Wang et al. |
| 2019/0077692 A1 | 3/2019 | Saha et al. |
| 2019/0107499 A1 | 4/2019 | Ellis et al. |
| 2019/0119172 A1 | 4/2019 | Kurimura et al. |
| 2019/0119803 A1 | 4/2019 | Tang et al. |
| 2021/0162624 A1 | 6/2021 | Ding |
| 2021/0395535 A1 | 12/2021 | Morra et al. |

FOREIGN PATENT DOCUMENTS

| | | |
|---|---|---|
| CN | 104607630 | 5/2015 |
| CN | 105122044 | 12/2015 |
| CN | 105814148 | 7/2016 |
| CN | 106917093 A | 7/2017 |
| CN | 108018516 A | 5/2018 |
| CN | 108018517 A | 5/2018 |
| CN | 108018518 A | 5/2018 |
| CN | 110283487 | 9/2019 |
| CN | 113817340 | 12/2021 |
| EP | 1197585 | 4/2002 |
| EP | 1471043 | 10/2004 |
| EP | 2298951 | 3/2011 |
| EP | 2886526 A1 | 6/2015 |
| EP | 3926013 | 12/2021 |
| FR | 2867277 | 9/2005 |
| JP | 2002060676 | 2/2002 |
| JP | 2019108888 A | 7/2019 |
| KR | 20150061404 | 6/2015 |

OTHER PUBLICATIONS

Deardorff et al., "Shining a Black Light on Coating Inspections", Photonics Media, Nov. 2010, 6 pages.

U.S. Appl. No. 16/906,691; Final Rejection mailed Sep. 28, 2023; (pp. 1-11).

U.S. Appl. No. 16/906,691; Non-Final Rejection mailed May 16, 2024; (pp. 1-5).

Lashmi PG et al: "Hot corrosion studies 1-15 on plasma sprayed bi-layered YSZ/La2Ce2O7thermal barrier coating fabricated from synthesized powders", Journal of Alloys and Compounds, Elsevier Sequoia, Lausanne, CH, vol. 711, Apr. 3, 2017 (Apr. 3, 2017), pp. 355-364, XP029988171, ISSN: 0925-8388, DOI: 10.1016/J.JALLCOM.2017.04.022.

Noveed Ejaz et al: "Sulfate-vanadate hot 1-15 corrosion of neodymium erate/yttria stabilized zirconia composite coating", International Journal of Applied Ceramic Technology, Blackwell Publishing, Malden, MA, US, vol. 16, No. 3, Dec. 13, 2018 (Dec. 13, 2018), pp. 931-942, P072314348, Technical Fields ISSN: 1546-542X, DOI: 10.1111/IJAC.13143.

Tabeshfar Mohadese et al: "Hot corrosion 1-15 of Gd2Zr2O7, d2Zr2O7/YbSZ, YSZ?+? Gd2Zr2O7/YbSZ, and YSZ thermal barrier coatings exposed to Na2SO4?+?V2O5", Surface and Coatings Technology, Elsevier, NL, vol. 409, Dec. 3, 2020 (Dec. 3, 2020), XP086498656, ISSN: 0257-8972, DOI: 10.1016/J.SURFCOAT.2020.126718.

U.S. Appl. No. 16/906,691; Non-Final Rejection mailed Mar. 3, 2023; (pp. 1-12).

Xu Zhenhua et al: "Hot corrosion behavior 1-15 of rare earth zirconates and yttria partially stabilized zirconia thermal barrier coatings", Surface and Coatings Technology, vol. 204, No. 21-22, Aug. 1, 2010 (Aug. 1, 2010), pp. 3652-3661, XP093041397, NL ISSN: 0257-8972, DOI: 10.1016/j.surfcoat.2010.04.044.

U.S. Appl. No. 16/906,691; Final Rejection mailed Dec. 2, 2024; (pp. 1-12).

U.S. Appl. No. 16/906,691; Notice of Allowance and Fees Due (PTOL-85) mailed Mar. 27, 2025; (pp. 1-11).

\* cited by examiner

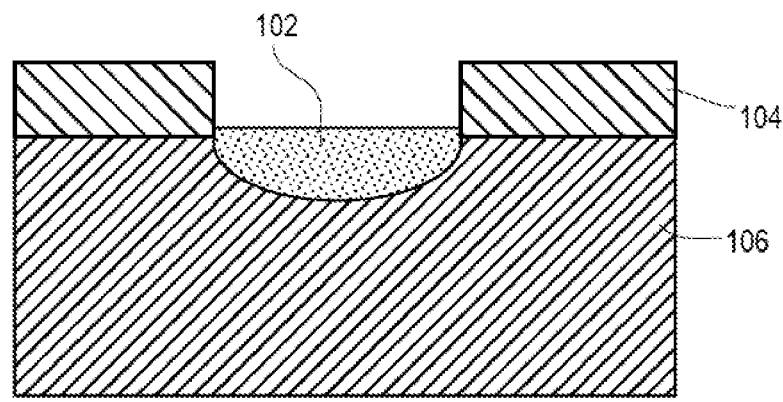
FIG. 1 PRIOR ART
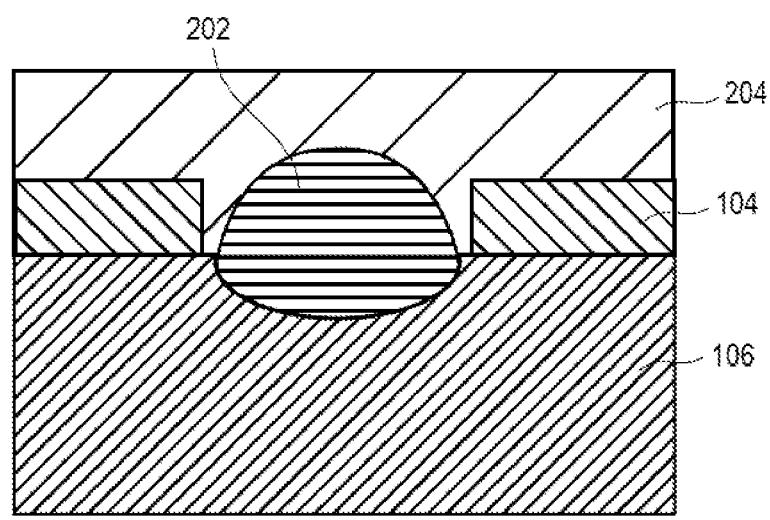
FIG. 2 PRIOR ART

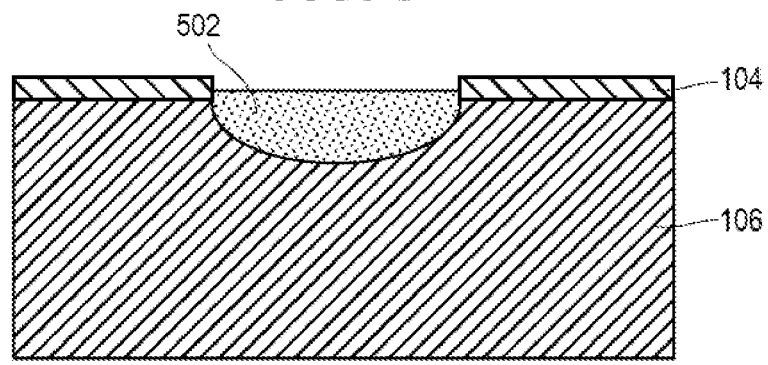
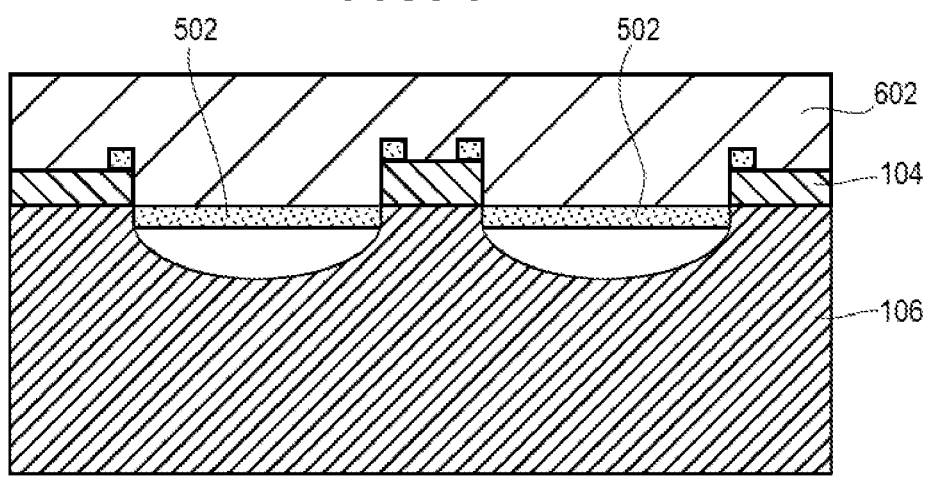

ANTI-CORROSION MATERIAL AND APPLICATION METHOD

TECHNICAL FIELD

This present disclosure generally relates to repairing components and, more particularly, to repairing components for corrosion protection.

BACKGROUND

A common method for repairing corroded portions of components requires multiple steps. These steps can include completely stripping the component of the conventional physical barrier coating through full immersion, heavy masking of the component in non-damaged areas, reapplying the conventional physical barrier coating on the entire component, and full furnace curing of the component to promote adhesion of the conventional physical barrier coating to the component.

BRIEF DESCRIPTION OF THE DRAWINGS

Various needs are at least partially met through provision of the Anti-corrosion Material and Application Method described in the following detailed description, particularly when studied in conjunction with the drawings. A full and enabling disclosure of the aspects of the present description, including the best mode thereof, directed to one of ordinary skill in the art, is set forth in the specification, which refers to the appended figures, in which:

FIG. 1 is a schematic cross-section view of a component having a barrier coating containing a damaged portion;

FIG. 2 is a microscopic schematic cross-section view of a component having a conventional physical barrier coating touchup set with corrosion pit forming on the surface of the component;

FIG. 5 is a schematic cross section view of a component having a reactive oxide coating applied thereto; and FIG. 6 is a schematic cross section view of a component having a reactive oxide coating interacting with the corrosion causing molten dust.

Figure 3:
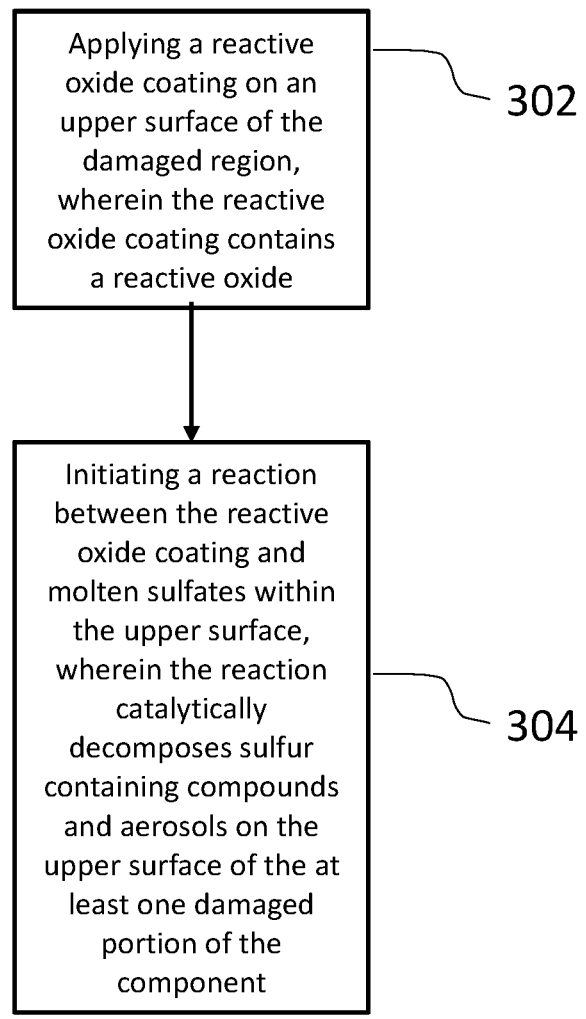
FIG. 3 is a representation of a flowchart of a process of repairing the conventional physical barrier coating barrier of a component with a reactive oxide coating.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present teachings. Also, common but well-understood elements that are useful or necessary in a commercially feasible embodiment are often not depicted in order to facilitate a less obstructed view of these various embodiments of the present teachings. Certain actions and/or steps may be described or depicted in a particular order of occurrence while those skilled in the art will understand that such specificity with respect to sequence is not actually required.

DETAILED DESCRIPTION

Stripping of the coating and reapplication can require substantial amount of time and money. Additionally, these stripping processes usually require several iterations. Chemically treated components require abrasive mechanical cleaning, for example, by aggressive grit blasting to provide a sufficiently clean surface for the process. Excessive chemical cleaning of components can excessively etch the surface of the component. Accordingly, it is desirable to be able to clean and remove corrosion on components in a manner that does not excessively or substantially remove or alter the base metal of the component.

Further, localized repair of conventional physical barrier coating is only available for purely cosmetic purposes due to the Environmental Health and Safety ("EHS") concerns with the full corrosion protection paint solution. Conventional full corrosion protection paint solutions contain hexavalent chromium in both the base and topcoat. Consequently, it must be applied in controlled environments, such as paint booths. Current methods of localized conventional physical barrier coating repair are designed to be brushed on by hand rapidly which prevent them from containing hexavalent chromium, necessary for creating a barrier to corrosion. Additionally, the cosmetic approach does not deter pitting from occurring on the components.

FIG. 1 illustrates a component having a damaged region. The component having a damaged region includes an alloy substrate 106, conventional physical barrier coating 104, and a damaged region 102. The alloy substrate 106 interacts with the molten sulfates, which are corrosive at temperatures from about 500° C. to about 982° C. The corrosive characteristics of the molten sulfates causes the damaged region 102 of the component that need to be repaired.

FIG. 2 illustrates a component having a corrosion pit formed on the surface of the component with a conventional physical barrier coating touch up set. The component includes an alloy substrate 106, conventional physical barrier coating 104, a corrosion pit 202, and corrosive sulfates 204. The corrosion pit 202 is formed due to the interaction of the corrosive sulfates 204 and the cosmetic conventional physical barrier coating touch up set. Corrosion pits cause a lack of full corrosion protection.

As such, new methods for localized repair of conventional physical barrier coating on components are desired.

Embodiments of the present disclosure relate to a sulfidation corrosion mitigation coating that can be used in power generation, aviation, and other applications involving corrosive environments, to protect articles such as gas turbine or engine components from sulfur corrosion and thereby significantly improve the service life of the articles. The sulfidation corrosion mitigation coating disclosed herein includes oxides capable of slowing or delaying any deleterious effects of sulfur. All corrosion mitigation coatings, when exposed to either sulfate containing dusts or aerosolized sulfur compounds at high temperatures, will resist the corrosive effects of sulfur containing species for some time interval. Failure to mitigate will occur when some macro or atomistic defect in the coating initiates a corrosion event in the underlying metal substrate. Sulfur corrosion, e.g., sulfidation, is one example of a typical problem for articles exposed to fuels or materials which comprise corrosive sulfur-containing compounds. Example corrosion events include the initiation of an oxide-containing pit, preferential corrosion, or oxidation of a phase in a metallic alloy, an ionic defect in a protective oxide layer that promotes enhanced ionic transport of charged corrosive species, mechanical damage to the substrate that introduces plastic deformation and hence accelerated diffusion of corrosive species, and/or cracks or surface connected porosity in the coating. For some forms of sulfidation, e.g., selective pit formation, initiation can start at temperatures as low as 550° C. to 600° C. The corrosion process can transition to pit link up and produce a uniform corrosion front or continue as isolated large corrosion at temperatures above 700° C. At temperatures higher than about 900° C., sulfidation may disrupt the normal oxidation process of metallic alloys and cause spallation of the protective oxide and attached coating along with internal oxidation of the article.

The terms and expressions used herein have the ordinary technical meaning as is accorded to such terms and expressions by persons skilled in the technical field as set forth above except where different specific meanings have otherwise been set forth herein. The word "or" when used herein shall be interpreted as having a disjunctive construction rather than a conjunctive construction unless otherwise specifically indicated. The terms "coupled," "fixed," "attached to," and the like refer to both direct coupling, fixing, or attaching, as well as indirect coupling, fixing, or attaching through one or more intermediate components or features, unless otherwise specified herein.

The singular forms "a", "an", and "the" include plural references unless the context clearly dictates otherwise.

Approximating language, as used herein throughout the specification and claims, is applied to modify any quantitative representation that could permissibly vary without resulting in a change in the basic function to which it is related. Accordingly, a value modified by a term or terms such as "about", "approximately", and "substantially", are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 10 percent margin.

The foregoing and other benefits may become clearer upon making a thorough review and study of the following detailed description.

Here, and throughout the specification and claims, the term catalytic oxide indicates an oxide that can catalytically decompose sulfur containing compounds and aerosols in the temperature range of about 500° C. to about 982° C.

Here, and throughout the specification and claims, the term sulfidation corrosion indicates high temperatures, above 500° C., degradation of native protective oxides and oxidation mitigation coatings by sulfur present in solid and liquid compounds, salts, aerosols, and gaseous mixtures. The term mitigation refers to slowing or delaying any deleterious effects sulfur may have on protective native oxides and oxidation mitigation coatings.

The coating of the present disclosure can include, consist essentially of, or consist of, the components of the present disclosure as well as other materials described herein. As used herein, "consisting essentially of" means that the composition or component may include additional materials, but only if the additional materials to not materially alter the basic and novel characteristics of the claimed composition or methods.

The coatings disclosed herein can also include one or more binders. Without being bound by any particular theory, the binder included can facilitate adhesion of the catalytic oxides to the underlying metal substrate, increasing the overall spall resistance of the coating. In certain embodiments, the binder is a water-base or solvent-base aluminum phosphate. As used herein, the term "aluminum phosphate" refers to any solution comprised of aluminum and phosphorus that is capable of bonding with oxide particles, such as oxides that are catalytic to the decomposition of sulfur containing compounds. In some embodiments, the aluminum phosphorous oxide has a phase as $AlPO_4$.

Instead of the use of binders, the coatings disclosed herein can also include one or more carrier solvents. Without being bound by any particular theory, the carrier solvent include can facilitate adhesion of the catalytic oxides to the underlying metal substrate. In certain embodiments, the carrier solvent is a solvent-base ethanol or other known carrier solvents. As used herein, the term "ethanol" refers to any solution comprised of ethanol that is capable of bonding with oxide particles, such as oxides that are catalytic to the decomposition of sulfur containing compounds. The use of carrier solvents allows for the reactive oxide coating to be applied in situ on, for example, wings of a plane and fully assembled engines. After application of the reactive oxide coating, the carrier solvent vaporizes off, leaving behind the active ingredient, reactive oxide, onto the target area. The reactive oxide will then be locally cured through use of an external heat source, or the heat generated from the engine.

The coating disclosed herein is a sulfidation corrosion mitigation coating including a sulfidation corrosion mitigation material. The sulfidation corrosion mitigation material can include any oxide that is catalytic to the decomposition of sulfur-containing compounds. In certain embodiments, the sulfidation corrosion mitigation material includes any oxide that is catalytic to the decomposition of sulfur-containing compounds at temperatures ranging from about 400° C. to about 800° C., such as about 500° C.

The sulfidation corrosion mitigation coating may be applied to the target surface via various coating processes, for example, spraying or deposition processes. In some embodiments, the slurry of the composition for preparing the sulfidation corrosion mitigation coating may be applied to the target surface by an atomizer spray, ultrasonic spray process or a wet-chemical deposition process, or a combination thereof. The term "wet-chemical deposition process" refers to a liquid-based coating process involving the application of a liquid precursor film on a substrate that is then converted to the desired coating by subsequent thermal treatments. Some examples of wet-chemical deposition methods include dip coating methods, spin coating methods, spray coating methods, die coating methods, and screen-printing methods.

The deposition methods in certain embodiments are accomplished by modifying the viscosity and/or other properties of the sulfidation corrosion mitigation to allow for multiple deposition methods, for example, by varying the water solvent levels of the reactive oxide coating or varying other solution levels of the coating.

The article according to embodiments of the present disclosure may be any article that comprises a surface having a coating exposable to an environmentcomprising a sulfur corrosive, such as a corrosive sulfur containing solid, liquid, or aerosol species. The article may include a metal substrate or a substrate having a metallic layer that has a surface exposed to a corrosive sulfur containing species. The metallic substrate may comprise any suitable metals or alloys, including but not limited to nickel-based and cobalt-based alloy alloys. In some embodiments, the surface of the article is a nickel-based superalloy substrate, a cobalt-based superalloy sub strate, or any combination thereof. In some embodiments, the article is a component of an aviation system or a power system, such as gas turbine or engine component.

The term "sulfur corrosive" or molten dust referred to herein may be a material which comprises a sulfur containing solid compound, liquid, or aerosol that is corrosive at temperatures from about 500° C. to 982° C. In some embodiments, the sulfur corrosive comprises other material (s), such as dust, or liquids, gases, oraerosols besides a sulfur comprising material. The sulfur comprising material may change in form among, for example, sulfide, sulfate, sulfur dioxide, and sulfur trioxide, according to the environment and corrosion reaction. In some embodiments,the sulfur comprising material comprises sodium sulfur ($Na_2SO_4$), potassium sulfur ($K_2SO_4$), magnesium sulfur ($MgSO_4$), calcium sulfur ($CaSO_4$), or any combination thereof.

In some embodiments, the environment is at an elevated temperature. The term "elevated temperature" used herein may generally refer to a temperature which is higher than normal, for example, higher than ambient temperature. In some embodiments, the "elevated temperature" refers to an operation temperature in powergeneration, aviation, or other applications involving hot and corrosive environments. For example, the elevated temperature may refer to an operation temperature in gas turbines or engines, such as a jet engine. In some embodiments, the elevated temperature refers to a temperature higher than about 500° C. The sulfidation corrosion mitigation coating according to embodiments of the present disclosure will mitigate corrosion at the elevated temperature in a range from about 500° C. to about 982° C.

Exemplary coatings and articles containing the coatings will be discussed herein with reference to FIGS. 3-6.

FIG. 3 is a flowchart illustrating an embodiment of a process of repairing the conventional physical barrier coating barrier of a component with a reactive oxide coating. At first step 302, a reactive oxide coating containing a reactive oxide is applied on an outer surface of a damaged region of a component. At step 304, the reactive oxide interacts with the molten sulfates within the outer surface of the component. The reactive oxide catalytically decomposes sulfur containing compounds and aerosols on the outer surface of at least one damaged portion of the component.

In certain embodiments, the reactive oxide coating on the outer surface of the damaged portion of the component is cured locally with an external heat source, or the heat generated from the engine.

In certain embodiments, the non-damaged region of the component is masked to prevent overspray.

In certain embodiments, the reactive oxide coating thickness range is less than 1 mils thick. The current art of physical barrier coatings ranges from about 1.5 mils to about 2.5 mils thick. The reduction in thickness in the reactive oxide coating allows for a higher allowance for overspray. The higher allowance for overspray lessens the requirement of heavy masking of non-target areas, reducing time and material costs. The reactive oxide coating can be applied in a single layer, whereas conventional techniques use a two-layer system of a base coat and a topcoat.

In certain embodiments, the reactive oxide coating has a coefficient of thermal expansion similar or near to the coefficient of thermal expansion to metal, causing the coating to expand and contract along with the underlying metal substrate. This increases the spall resistance of the reactive oxide coating. The reactive coating has a superior strain compliance compared to the conventional physical barrier coatings.

In certain embodiments, the reactive oxide coating can be formed with different viscosities to facility different deposition methods, for example spraying and brushing.

In certain embodiments, the reactive oxide coating can be applied as more than one layer to increase the overall durability of the reactive oxide coating.

In certain embodiments, the reactive oxide coating has superior coating durability compared to conventional physical barrier coatings, including in relation to spalling, delamination, and cracking.

Figure 4:
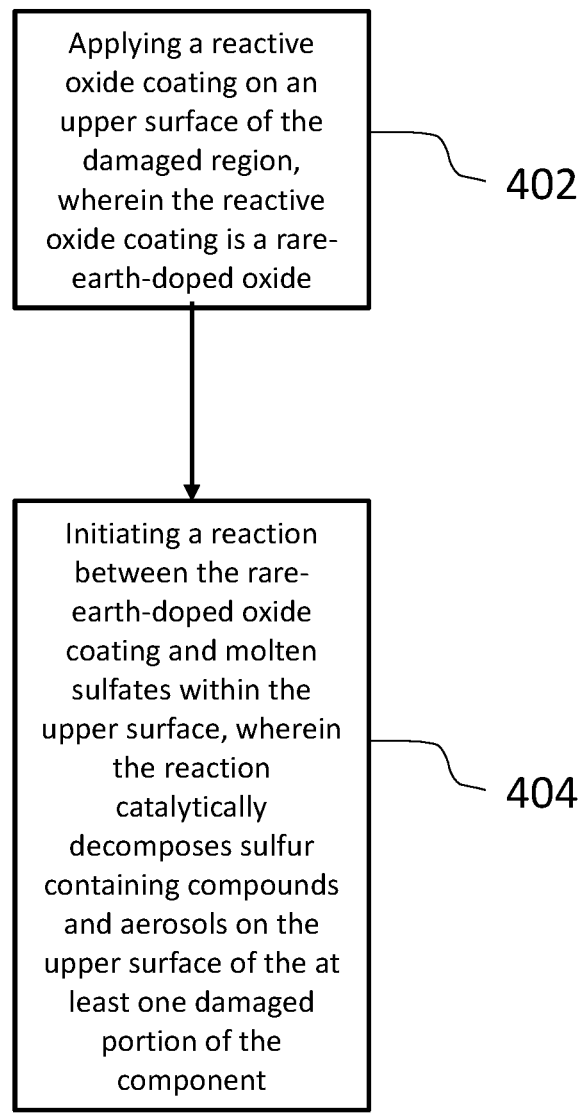
FIG. 4 is a representation of a flowchart of a process of repairing the conventional physical barrier coating barrier of a component with a rare-earth-doped oxide coating.

FIG. 4 is a flowchart illustrating an embodiment of a process of repairing the conventional physical barrier coating of a component with a rare-earth-doped oxide coating. At first step 402, a reactive oxide containing a rare-earth-doped oxide coating is applied on an upper surface of a damaged region of a component. At step 404, the rare-earth-doped oxide catalytically decomposes sulfur containing compounds and aerosols on the upper surface of at least one damaged portion of the component.

In certain embodiments, the rare earth doped oxide is Gadolinium Doped Ceria or Yttria Stabilized Zirconia.

FIG. 5 is a schematic cross section view of a component having a reactive oxide coating applied thereto in accordance with methods described herein. The component having a reactive oxide coating includes an alloy substrate 106, conventional physical barrier coating 104, and a reactive oxide coating 502. The alloy substrate 106 is fully painted with conventional physical barrier coating 104. The reactive oxide coating 502 is applied on to the outer surface of the alloy substrate 106 to provide corrosion protection to damaged regions of the alloy substrate 106 lacking conventional physical barrier coating 104. The reactive oxide coating 502 catalytically decomposes sulfur containing compounds and aerosols that interact with the conventional physical barrier coating 104 on the alloy substrate 106 causing corrosion of the alloy substrate 106.

In certain embodiments, the reactive oxide coating is applied via a patch onto the damaged region of the component.

In certain embodiments, the reactive oxide coating has a higher degree of overspray tolerance to allow for a degree of coating overlap in non-target areas to ensure no gaps are present in corrosion protection for the component.

FIG. 6 is a schematic cross section view of a component having a reactive oxide coating interacting with corrosion causing molten dust. The component having a reactive oxide coating interacting with corrosion causing molten dust includes an alloy substrate 106, conventional physical barrier coating 104, reactive oxide coating 502, and molten dust 602. The alloy substrate 106 is fully painted with conventional physical barrier coating 104. The reactive oxide coating 502 is applied on to the outer surface of the alloy substrate 106 to provide corrosion protection to damaged regions of the alloy substrate 106 lacking conventional physical barrier coating 104. The molten dust 602 consists mainly of sulfur containing compounds and aerosols. The reactive oxide coating 502 interacts with the molten dust 602 in a catalytic reaction. The catalytic reaction occurs between the reactive oxide coating 502 and the molten dust 602 to catalytically decomposes sulfur containing compounds and aerosols that interact with the conventional physical barrier coating 104 on the alloy substrate 106 causing corrosion of the alloy substrate 106.

In certain embodiments, the process of repairing components with corrosion damages includes multiple steps. These steps can include removing any remaining partially damaged conventional physical barrier coating in the area to be repaired, preparing the damaged area for proper adhesion and condition to make the reactive oxide coating adhere and repair the damaged area, for example by grit blasting or sanding, to apply the reactive oxide coating, masking to restrict the application of the reactive oxide coating to the area to be repaired, applying the reactive oxide coating onto the damaged area of the component, and localized curing of the reactive oxide coating through the use of an external heat source or the heat generated from a gas turbine engine.

Further aspects of the invention are provided by the subject matter of the following clauses:

There is a method provided for corrosion mitigation on a component having at least one damaged portion. The method comprises (1) applying a coating on an outer surface of the at least one damaged portion, the coating comprising a reactive oxide; and (2) initiating a reaction between the coating and molten sulfates at the outer surface, the reaction catalytically decomposes the molten sulfates, wherein the molten sulfates comprises of sulfur containing compounds and aerosols, at the outer surface of the at least one damaged portion of the component.

The method may further include curing the reactive coating on the outer surface of the damaged region locally.

The method may further include masking the component to restrict applying the reactive oxide coating to the damaged portion.

The method may further include preparing the damaged portion to retain the reactive oxide coating.

The method may further include preparing comprises at least one of sanding and grit blasting.

The reactive oxide coating range may be about less than or equal to 1.0 mils thick.

The method may further include altering the viscosity of the reactive oxide coating depending on a predetermined application method.

The method may include an application method that is at least one of spraying and brushing.

The method may include the reactive oxide coating having operating temperature ranges from about 500 C to about 982 C.

The method may include the reactive oxide having a rare-earth-doped-oxide.

The rare-earth-doped-oxide may be at least one of gadolinium doped ceria and yttria stabilized zirconia.

There provided another method for corrosion mitigation on a component having at least one damaged portion. The other method including at least (1) applying a coating on an outer surface of the at least one damaged portion, the coating comprising a reactive rare-earth-doped-oxide; and (2) initiating a reaction between the coating and molten sulfates at the outer surface, the reaction catalytically decomposes the molten sulfates, wherein the molten sulfates comprises of sulfur containing compounds and aerosols, at the outer surface of the at least one damaged portion of the component.

The other method may include curing the reactive coating on the outer surface of the damaged region locally.

The other method may include the rare-earth-doped-oxide having at least one of gadolinium doped ceria and yttria stabilized zirconia.

The other method may include the component being masked to restrict the application of the reactive oxide coating to the damaged portion.

The other method may include preparing the damaged portion of the component for proper adhesion of the reactive oxide coating to the component.

The other method may include preparing the damaged portion of the component for proper adhesion using at least one of sand papering and grip blasting.

The other method may include the reactive oxide coating range being about less than or equal to 1.0 mils thick.

The other method may further include varying a viscosity of the reactive oxide coating to be coordinated with a predetermined application method.

The other method may include the application method being at least one of brushing and spraying.

Those skilled in the art will recognize that a wide variety of modifications, alterations, and combinations can be made with respect to the above-described embodiments without departing from the scope of the invention, and that such modifications, alterations, and combinations are to be viewed as being within the ambit of the inventive concept.

What is claimed is:

1. A method for corrosion mitigation on a metallic alloy component having thereon a corrosion-protective paint including an active ingredient and having at least one corrosion-damaged portion, the method comprising:
    applying an anti-corrosion coating directly onto and in contact with a corroded surface of the at least one corrosion-damaged portion of the metallic alloy component, the anti-corrosion coating comprising a reactive rare-earth-doped oxide that is not the active ingredient of the corrosion-protective paint, wherein the reactive rare-earth-doped oxide is gadolinium doped ceria; and
    initiating a reaction between the anti-corrosion coating and molten sulfates comprising sulfur containing compounds and aerosols on the corroded surface of the at least one corrosion-damaged portion of the metallic alloy component, the reaction catalytically decomposing the molten sulfates on the corroded surface of the at least one corrosion-damaged portion of the metallic alloy component.

2. The method according to claim 1, further comprises the step of curing the anti-corrosion coating on the corroded surface of the at least one corrosion-damaged portion locally.

3. The method of claim 1, further comprises the step of masking the metallic alloy component to restrict applying the anti-corrosion coating to the at least one corrosion-damaged portion.

4. The method of claim 1, further comprising the step of preparing the at least one corrosion-damaged portion of the metallic alloy component to retain the anti-corrosion coating.

5. The method of claim 4, wherein the step of preparing comprises at least one of sanding and grit blasting.

6. The method of claim 1, wherein the anti-corrosion coating is less than or equal to 1.0 mils thick.

7. The method of claim 1, further comprising the step of altering a viscosity of the anti-corrosion coating depending on a predetermined application method.

8. The method of claim 7, wherein the predetermined application method comprises at least one of spraying and brushing.

9. The method of claim 1, wherein the anti-corrosion coating operating temperature ranges from 500C to 982C.

10. A method for corrosion mitigation on a metallic alloy component having thereon a physical barrier coating including an active ingredient and having at least one corrosion-damaged portion lacking the physical barrier coating thereon, the method comprising:
    applying an anti-corrosion coating onto a corroded surface of the at least one corrosion damaged portion of the metallic alloy component lacking the physical barrier coating thereon, the anti-corrosion coating comprising a reactive rare-earth-doped-oxide that is not the active ingredient of the physical barrier coating, wherein the reactive rare-earth-doped-oxide is gadolinium doped ceria; and initiating a reaction between the anti-corrosion coating and molten sulfates comprising sulfur containing compounds and aerosols on the corroded surface of the at least one corrosion- damaged portion of the metallic alloy component lacking the physical barrier coating thereon, the reaction catalytically decomposing the molten sulfates on the corroded surface of the at least one corrosion-damaged portion of the metallic alloy component.

11. The method according to claim 10, further comprises the step of curing the anti-corrosion coating on the corroded surface of the at least one corrosion-damaged portion locally.

12. The method of claim 10, wherein the component is masked to restrict an application of the anti-corrosion coating to the at least one corrosion-damaged portion of the metallic alloy component.

13. The method of claim 10, wherein the at least one corrosion-damaged portion of the component is prepared for adhesion of the anti-corrosion coating to the metallic alloy component.

14. The method of claim 13, wherein the metallic alloy component is prepared for the adhesion via at least one of sanding and grit blasting.

15. The method of claim 10, wherein the anti-corrosion coating is less than or equal to 1.0 mils thick.

16. The method of claim 10, further comprises the step of varying a viscosity of the anti-corrosion coating to be coordinated with a predetermined application method.

17. The method of claim 16, wherein the predetermined application method comprises at least one of brushing and spraying.

* * * * *